(12) United States Patent
Li et al.

(10) Patent No.: US 7,629,771 B2
(45) Date of Patent: Dec. 8, 2009

(54) PROTECTION DEVICE FOR NON-COMMON GROUND BUSES

(75) Inventors: Guoxing Li, Sunnyvale, CA (US); Shiqiang Liu, Chengdu (CN); Sean Xiao, Shanghai (CN)

(73) Assignee: O2Micro International, Ltd., Georgetown (KY)

( * ) Notice: Subject to any disclaimer, the term of this patent is extended or adjusted under 35 U.S.C. 154(b) by 470 days.

(21) Appl. No.: 11/645,985

(22) Filed: Dec. 27, 2006

(65) Prior Publication Data

US 2007/0188950 A1 Aug. 16, 2007

Related U.S. Application Data

(60) Provisional application No. 60/771,824, filed on Feb. 9, 2006.

(51) Int. Cl.
*H02J 7/00* (2006.01)
*H02J 1/00* (2006.01)
*H02J 3/00* (2006.01)
*H02H 3/20* (2006.01)
*H02H 3/24* (2006.01)

(52) U.S. Cl. ............... 320/134; 320/132; 320/136; 307/85; 307/86; 307/87; 361/78; 361/79; 361/88; 361/90

(58) Field of Classification Search ............... 320/134, 320/132, 136
See application file for complete search history.

(56) References Cited

U.S. PATENT DOCUMENTS

| 5,890,780 | A * | 4/1999 | Tomiyori | 307/86 |
| 7,215,096 | B2 * | 5/2007 | Miura et al. | 320/134 |
| 7,365,952 | B2 * | 4/2008 | Sato | 361/90 |
| 2002/0000788 | A1 * | 1/2002 | Ostergaard et al. | 320/128 |
| 2005/0156573 | A1 * | 7/2005 | Lin | 320/134 |
| 2005/0162131 | A1 * | 7/2005 | Sennami et al. | 320/128 |

* cited by examiner

*Primary Examiner*—Albert W Paladini
*Assistant Examiner*—Dharti Patel
(74) *Attorney, Agent, or Firm*—Wang Law Firm, Inc.; Li K. Wang

(57) ABSTRACT

A protection device for non-common ground buses is disclosed. The protection circuit includes a controller, a level shifter, a first group of switches, and a second group of switches. The controller together with the level shifter controls the first group and second group of switches. The non-common ground buses will be isolated when at least one group of the switches are turned off in an abnormal condition.

12 Claims, 13 Drawing Sheets

PROTECTION DEVICE FOR NON-COMMON GROUND BUSES

RELATED APPLICATION

This application claims the benefit of U.S. provisional application, titled Non-common Ground Bus Communication and Protection Circuits, Ser. No. 60/771,824, filed on Feb. 9, 2006, the specification of which is incorporated herein in its entirety by this reference.

BACKGROUND OF THE INVENTION

1. Field of the Invention

The present invention relates to electronic systems and in particular to a protection device for buses in the electronic systems.

2. Description of the Related Art

Currently, electronic systems are becoming more and more common in today's society as the capabilities and uses of such electronic systems continue to expand. Many electronic systems are powered by batteries that can form a battery pack. The batteries can include rechargeable batteries. The rechargeable batteries can include alkaline batteries such as well-known nickel cadmium (Ni—Cd) or nickel metal hydride (Ni-MH) batteries. Recently, lithium ion (Li-ion) batteries have gained more popularity in some high-end electronic systems because they exhibit high energy density and stable storage capability.

In battery pack applications, communication between the battery pack and an external device is implemented by a bus. The bus usually is a low voltage bus, such as I2C, SMBus, etc. If the ground of the battery pack is directly connected to the ground of the external device, the bus is called a common ground bus. In this situation, two P-channel MOSFETs may be employed to control the charging and discharging of the battery.

When the ground of the battery pack is not directly connected to the ground of the external device, the bus is called a non-common ground bus. Turning to FIG. 1, a prior art battery pack application 100 with the common ground bus is illustrated. The battery pack application 100 includes a battery pack 110 and an external device 150. The battery pack 110 is composed of a battery 111, a controller 113, and a plurality of switches. In this embodiment, the plurality of switches includes two N-channel MOSFETs 115 and 117 that control the charging and discharging loops of the battery 111. The external device 150 can be a load or a charger. The battery pack 110 communicates with the external device 150 via a low voltage bus. The battery pack 110 and external device 150, each includes an embedded interface unit (not shown) that enables it to interface with the bus. Hence, the bus can also be called an interface bus.

When either the N-channel MOSFET 115 or the N-channel MOSFET 117 is turned off, the ground of the external device 150 will not be the real ground while the battery 111 is connected to the real ground. When both of the MOSFETs 115 and 117 are turned off, the ground of the external device 150 will also not be the real ground. Hence, the ground of the external device 150 will be floating. In this situation, an undesired current will flow through the bus when there is a voltage difference between the voltage $V_{BATT}$ of the battery 111 and the voltage $V_L$ or $V_{CHG}$ of the external device 150. FIG. 2A illustrates an operation mode 200A of the battery pack application 100. In this operation mode, $V_{BATT}$ is higher than $V_L$ or $V_{CHG}$, and hence an undesired current will flow from the battery 110 to the external device 150 and then to the real ground (i.e., the ground of the battery 111) via the bus. FIG. 2B illustrates another operation mode 200B of the battery pack application 100. In this operation mode, $V_{BATT}$ is lower than $V_L$ or $V_{CHG}$, and hence an undesired current will flow from the external device 150 to the battery 111 and then to the ground of the external device 150 via the bus. The undesired currents described above may cause the interface units to be entirely destroyed.

In order to avoid the above-mentioned problem, an isolation technology is used to isolate the communication between the battery pack 110 and the external device 150 via the bus. Turning to FIG. 3, a simplified block diagram of a prior art opto-coupler isolating application 300. In this embodiment, an isolating circuit 310 is used to isolate the bus connected to the battery pack 110 from the bus connected to the external device 150. The isolating circuit 310 can include at least one opto isolator. Although the protection for the non-common ground bus can be implemented by the isolation technique, the insertion of the opto-coupler results in power loss and extra cost to the battery pack application.

It is thus desirous to have an apparatus that provides protection for the non-common ground buses embedded in the battery pack application with low power dissipation and low cost. It is to such apparatus and method the present invention is primarily directed.

BRIEF SUMMARY OF THE INVENTION

In one embodiment, there is disclosed a protection device for non-common ground buses. The non-common ground buses include a first bus and a second bus. The protection device includes a controller, a level shifter, a first group of switches, and a second group of switches. The controller is coupled in parallel to a battery and the controller generates a first control signal and a second control signal. The level shifter is coupled to the battery and the controller. The level shifter receives the first control signal and generates a third control signal. The first group of switches is coupled to the controller via the first bus and to an external element via the second bus. The first group of switches is controlled by the second control signal from the controller and the third control signal from the level shifter. The second group of switches is coupled between the ground of the battery and the ground of the external element. The second group of switches is controlled by the second control signal from the controller and the third control signal from the level shifter. At least part of the first group of switches is turned off to isolate the first bus from the second bus when an abnormal situation occurs.

In another embodiment, there is disclosed a protection device for non-common ground buses. The non-common ground buses include a first bus and a second bus. The protection device includes a controller, a level shifter, a first group of switches, and a second group of switches. The controller is coupled in parallel to a battery and the controller generates a charging signal, a discharging signal, and a first control signal. The level shifter is coupled to the battery and the controller. The level shifter receives the first control signal and generates a second control signal at a node. The first group of switches is coupled to the controller via the first bus and to an external element via the second bus. The first group of switches is controller by the second control signal from the level shifter. The second group of switches is coupled between the ground of the battery and the ground of the external element. The second group of switches is controlled by the charging signal and the discharging signal from the controller. At least part of the first group of switches is turned off to isolate the first bus from the second bus when an abnormal situation occurs.

In yet another embodiment, there is disclosed an apparatus for protecting non-common ground buses. The non-common ground buses include a first bus and a second bus. The apparatus includes a controller, a first level shifter, a first switch, a second level shifter and a second switch. The controller is coupled in parallel to a battery. The first level shifter is coupled in parallel to the battery and the first level shifter exchanging information with the controller. The first switch is coupled between an anode of the battery and a node. The first switch is controlled by the first level shifter. The second level shifter is coupled in parallel to an external element. The second switch is coupled between the anode of the battery and the ground of the external element. The second switch is controlled by the second level shifter.

In yet another embodiment, there is disclosed an apparatus for protecting non-common ground buses. The non-common ground buses include a first bus and a second bus. The apparatus includes a controller, a first level shifter, a first low drop-out (LDO) circuit, a second level shifter, and a second LDO circuit. The controller is coupled in parallel to a battery. The first level shifter is coupled to the battery and the controller. The first low drop-out (LDO) circuit is coupled in parallel to the battery and the first LDO circuit generates a first output voltage to supply the first level shifter. The second level shifter is coupled in parallel to an external element. The second level shifter communicates with the first level shifter via the first and the second buses. The second LDO circuit is coupled in parallel to the external element. The second LDO circuit generates a second output voltage to supply the second level shifter.

In yet another embodiment, there is disclosed an electrical vehicle. The electrical vehicle includes body, an electric motor for driving the body and a battery device for supplying power to the electric motor. The battery device is capable of protecting non-common ground buses. The non-common ground buses include a first bus and a second bus. The battery device includes a battery, a controller, a level shifter, a first group of switches, and a second group of switches. The controller is coupled in parallel to a battery and the controller generates a first control signal and a second control signal. The level shifter is coupled to the battery and the controller. The level shifter receives the first control signal and generates a third control signal. The first group of switches is coupled to the controller via the first bus and to the electric motor via the second bus. The first group of switches is controlled by the second control signal from the controller and the third control signal from the level shifter. The second group of switches is coupled between the ground of the battery and the ground of the electric motor. The second group of switches is controlled by the second control signal from the controller and the third control signal from the level shifter. At least part of the first group of switches is turned off to isolate the first bus from the second bus when an abnormal situation occurs.

In yet another embodiment, there is disclosed a method for protecting an interface bus in a battery application system. The method comprising the steps of detecting states of a battery and an external device, generating a charging control signal and a discharging control signal at a controller according to a detection result, translating the charging control signal into a switch control signal, exchanging information between the battery and the external device via the interface bus during a charging and discharging mode, turning off a plurality of charging switches under control of the switch control signal to isolate the external device from the battery when an abnormal condition occur in the charging mode, and turning off a plurality of discharging switches under control of the discharging control signal to isolate the external device from the battery when the abnormal condition occurs in the discharging mode.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Figure 1:
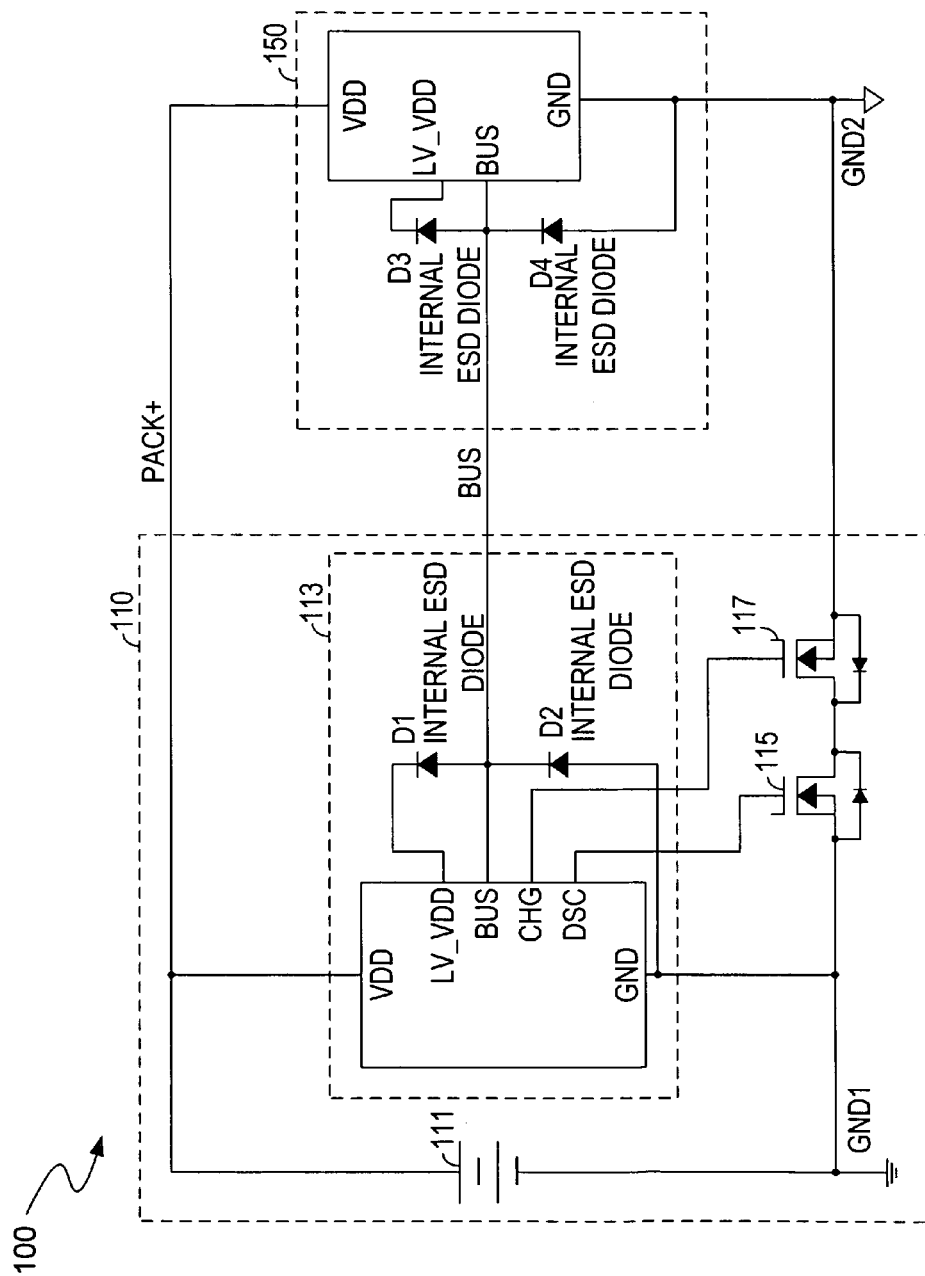
FIG. 1 is a simplified block diagram of a prior art battery pack application.
Figure 2A:
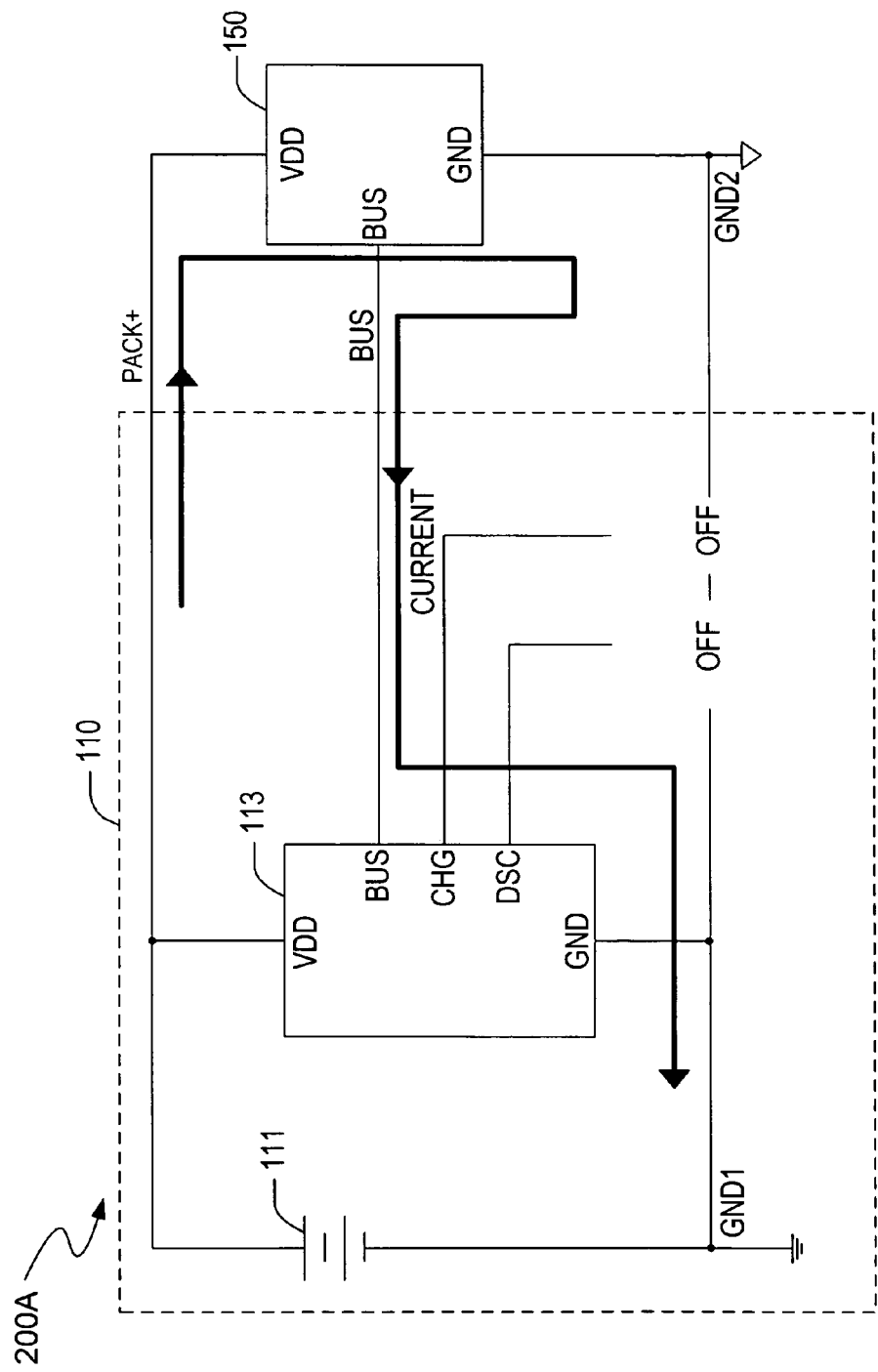
FIG. 2A is a simplified schematic diagram of one operation mode of the prior art battery pack application in FIG. 1 when $V_{BATT}$ is larger than $V_L$ or $V_{CHG}$.
Figure 2B:
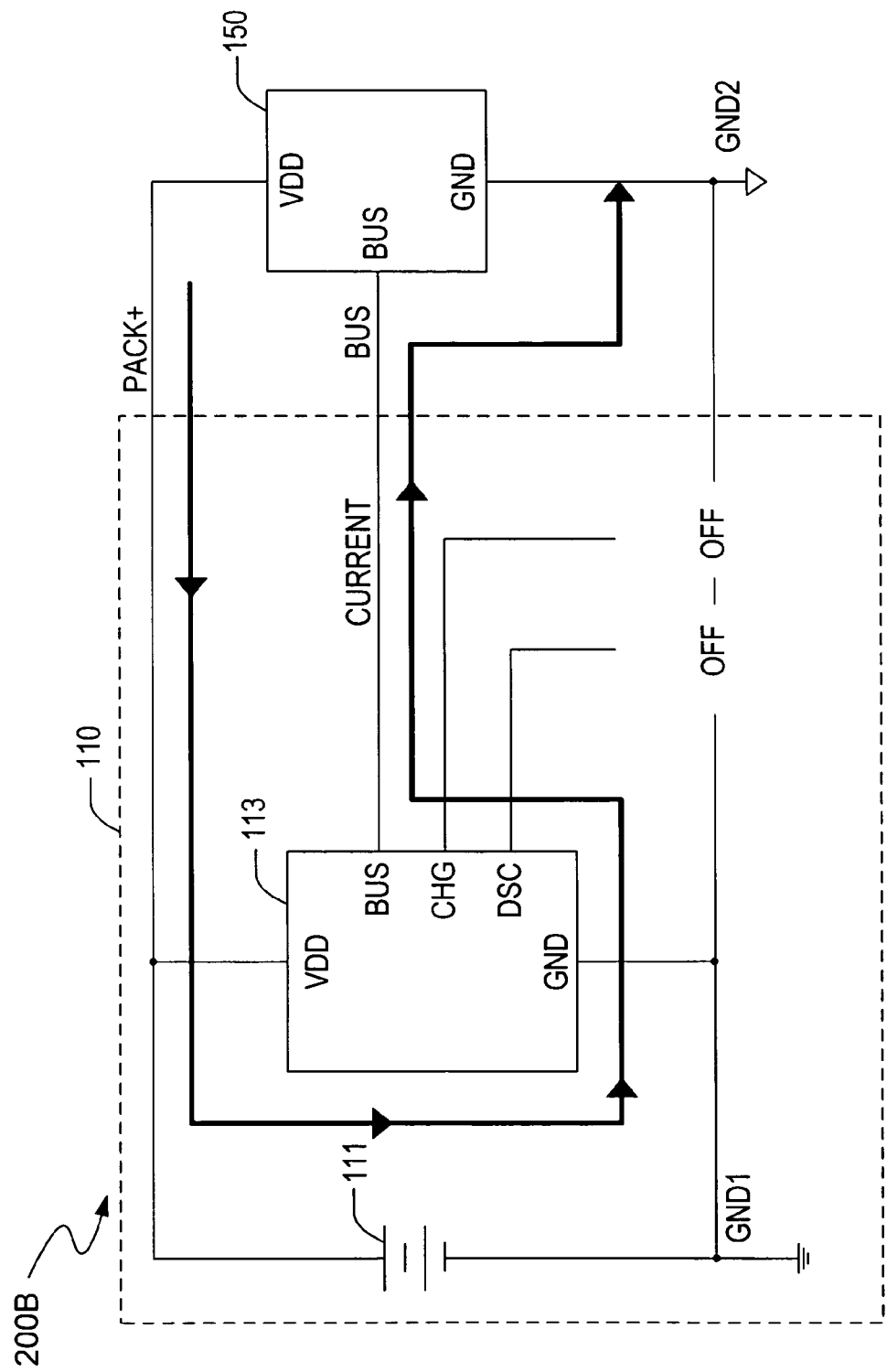
FIG. 2B is a simplified schematic diagram of another operation mode of the prior art battery pack application in FIG. 1 when $V_{BATT}$ is smaller than $V_L$ or $V_{CHG}$.
Figure 3:
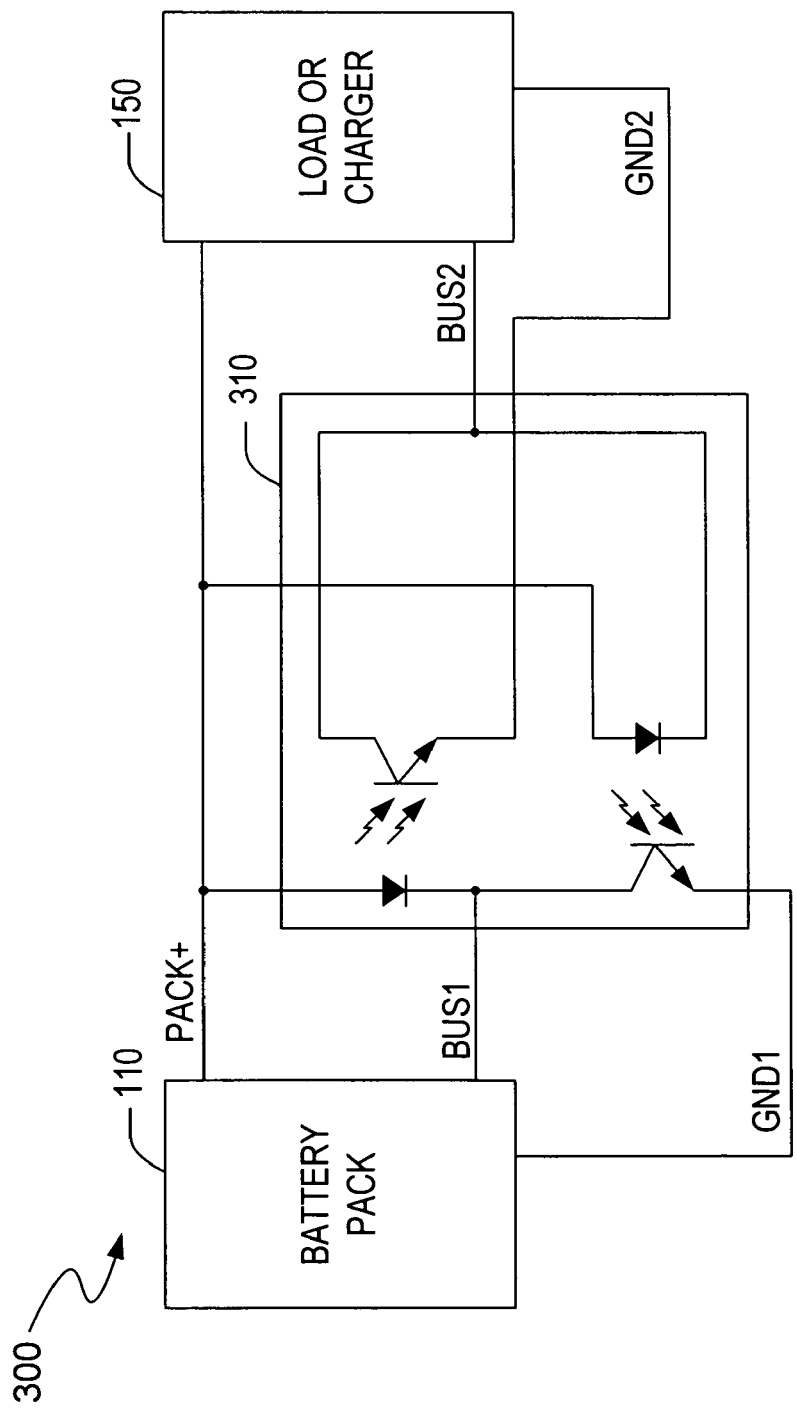
FIG. 3 is a simplified block diagram of a prior art opto-coupler isolating application.
Figure 4:
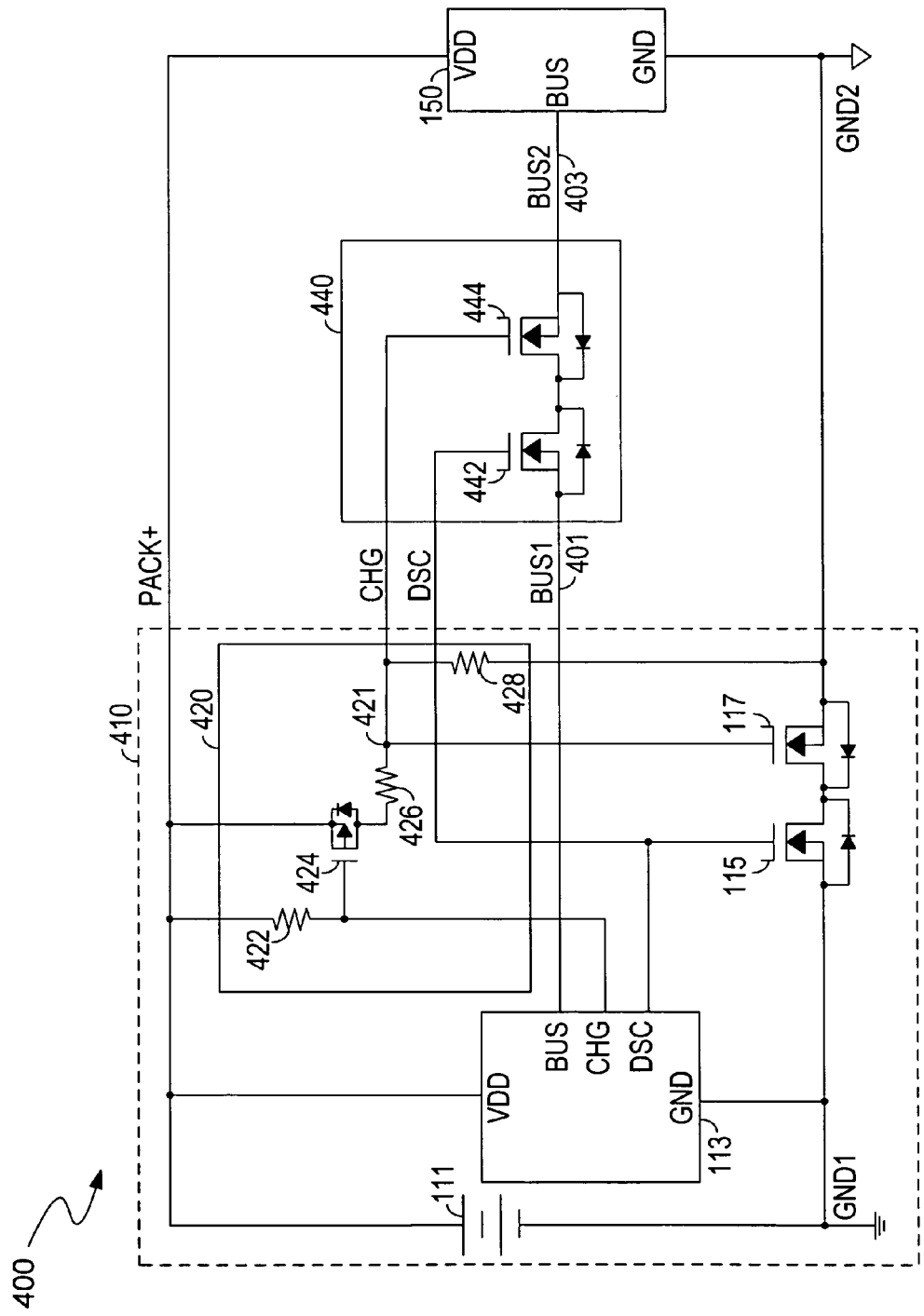
FIG. 4 is a simplified schematic diagram of a battery pack application with analog switches controlled by two control ports according to the invention.

FIG. 4 depicts a simplified schematic diagram of a battery pack application 400 with analog switches controlled by two control ports. The battery pack application 400 includes a battery pack 410, a bus protection circuit 440, and an external device 150. The battery pack 410 further includes a battery 111, a controller 113, a plurality of switches 115 and 117, and a level shift circuit 420. In this embodiment, the battery pack 410 includes NMOS transistors 115 and 117 and the bus protection circuit 440 includes NMOS transistors 442 and 444. The NMOS transistors 442 and 444 are analog switches controlled by two control ports. Each of the aforementioned NMOS transistors is equipped with an intrinsic diode. A bus 401 is used for communication between the controller 113 and the bus protection circuit 440, and a bus 403 is used for communication between the bus protection circuit 440 and the external device 150. The bus protection circuit 440 can protect the buses 401 and 403 when abnormal situations occur. Compared with the battery pack application 100, the battery pack application 400 further includes the level shift circuit 420 that can drive the bus protection circuit 440.

The battery 111 is connected between terminal PACK+ and terminal GND1. The terminal GND1 is the real ground. The controller 113 is coupled in parallel to the battery 111. The controller 113 can receive the voltage at terminal PACK+ that is referenced to the ground (i.e., a ground referenced voltage). The controller 113 can generate a discharging control signal to control the NMOS transistors 115 and 442. The controller 113 can also generate a charging control signal used to drive the level shift circuit 420 so that the voltage at terminal PACK+ is transformed to a control signal at node 421. The control signal at node 421 is used to control the NMOS transistors 117 and 444. The NMOS transistors 115 and 117 are utilized to control the charging and the discharging of the battery 111.

The level shift circuit 420 is connected between terminal PACK+ and the controller 113. The level shift circuit 420 is composed of a resistor 422, a PMOS transistor 424 and a voltage divider formed by resistors 426 and 428. The resistor 422 is coupled between the anode of the battery 111 and the controller 113. The PMOS transistor 424 is controlled by the controller 113. The resistor 422 is also connected between the source terminal and the gain terminal of the PMOS transistor 424. Under control of the charging control signal, the level shift circuit 420 can output the control signal at node 421 to control the NMOS transistors 117 and 444.

The protection circuit 440 is coupled to the controller 113 via the bus 401 and to the external device 150 via the bus 403. The NMOS transistor 442 and/or the NMOS transistor 444 can be turned off to isolate the bus 401 from the bus 403. In the isolation condition, the NMOS transistor 115 and/or the NMOS transistor 117 can be also turned off. Hence, the buses 401 and 403 do not have a common ground. In brief, the buses 401 and 403 are called non-common ground buses in this isolation condition.

Although only two NMOS transistors 115 and 117 are used to control the charging and discharging of the battery 111 as illustrated in FIG. 4, those skilled in the art will appreciate that any number (larger than two) of the NMOS transistors may also be used. Similarly, the protection circuit 440 can be formed by any number (larger than two) of the NMOS transistors. In addition, at least some NMOS transistors (switches) in the protection circuit 440 will be turned off to isolate the communication between the battery 111 and the external device 150 when any abnormal situation occurs.

FIGS. 5[A-D] illustrate operation modes of the battery pack application 400. The NMOS transistors shown in FIG. 4 will be omitted when they are turned on or off for clarity. When the NMOS transistors are turned on, only the conduction states are illustrated in FIGS. 5[A-D]. When the NMOS transistors are turned off, only their intrinsic diodes are shown for illustrative purposes.

Figure 5A:
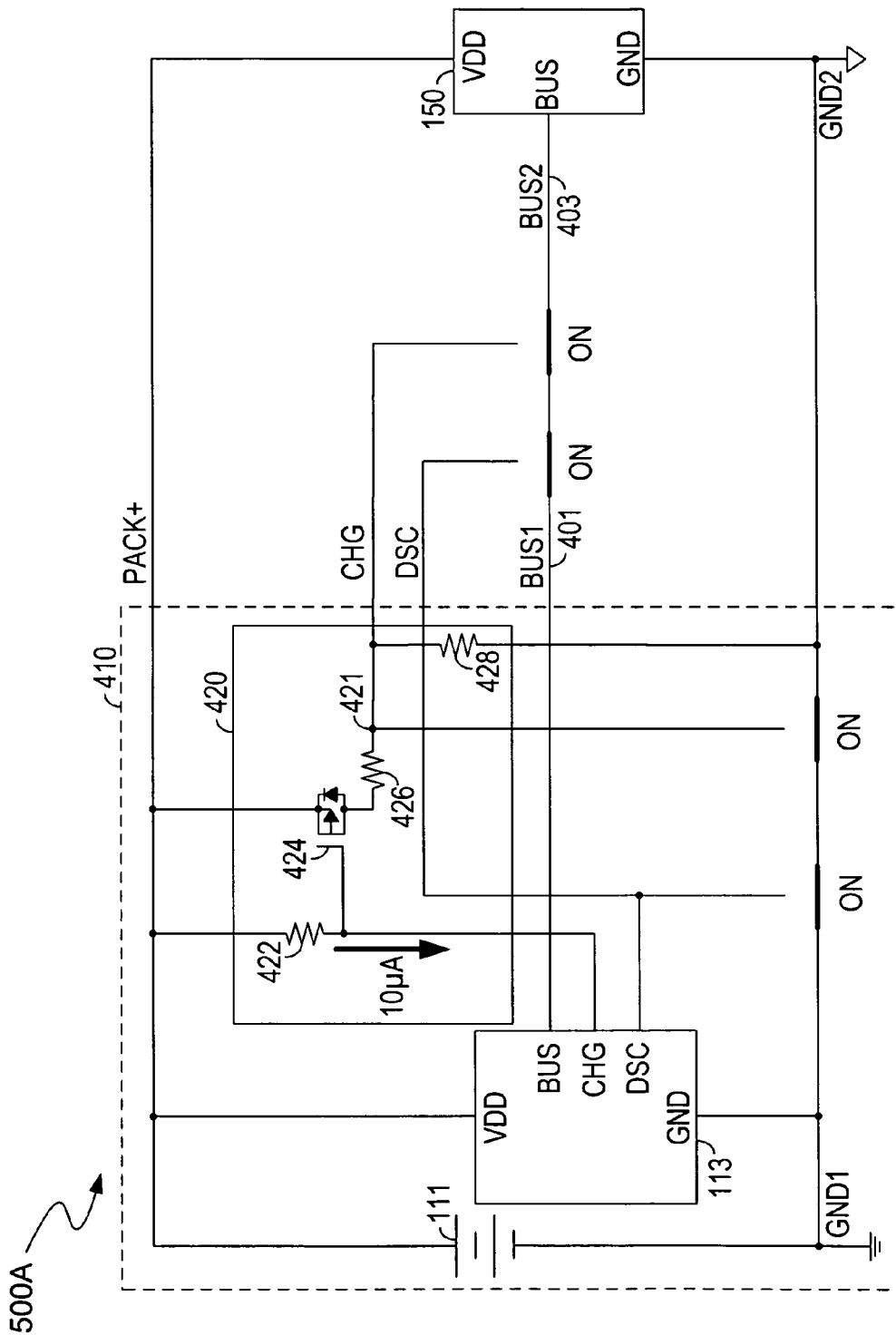
FIGS. 5[A-D] depict operation modes of the battery pack application in FIG. 4.

FIG. 5A depicts a normal mode in which the battery pack application 400 operates. In this mode, a current can flow from terminal PACK+ to the controller 113 through the resistor 422. The charging control signal and the discharging control signal provided by the controller 113 will be set respectively low (logic 0) and high (logic 1). Then the PMOS transistor 424 is turned on so that the voltage at terminal PACK+ will be divided by the voltage divider. As a result, the control signal at node 421 is set to high. Controlled by the control signal, the NMOS transistors 117 and 444 are turned on. Likely, the NMOS transistors 115 and 442 are also turned on simultaneously. Hence, the ground of the external device 150 is coupled to the ground of the battery 111 and the buses 401 and 403 are common ground buses. In the normal mode, the battery 111 will supply power to the external device 150 when the external device 150 is a load and the controller 113 can monitor the entire discharging process. If the external device 150 is a charger, the battery 111 will be charged and the controller 113 can sense the whole charging process. In the normal mode, the battery pack 410 can communicate with the external device 150 via the buses 401 and 403.

Figure 5B:
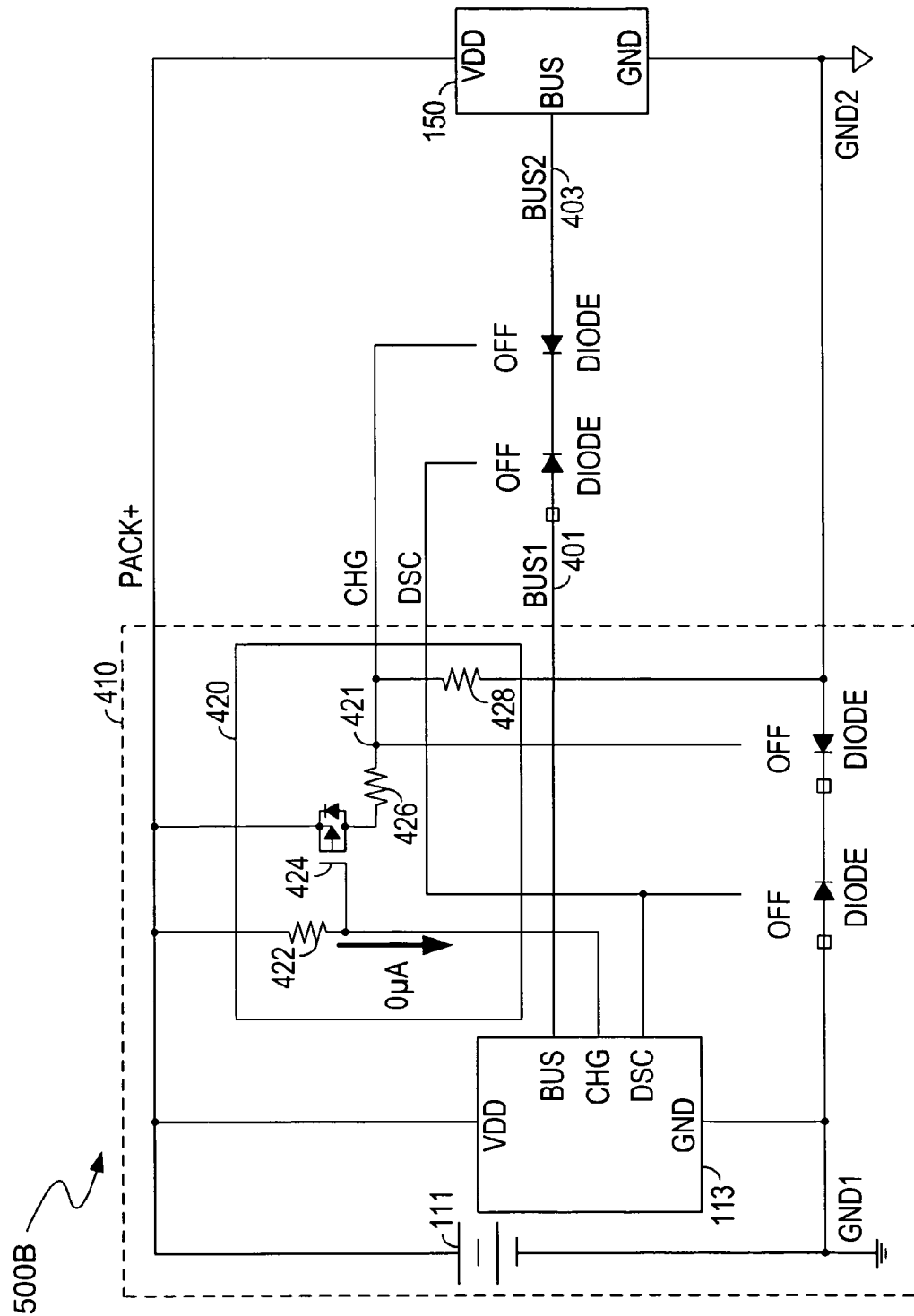

FIG. 5B depicts an abnormal mode in which the battery pack application 400 operates. When the controller 113 senses that some abnormal situations, for example, large current or high temperature situations, occur at the battery 111 or the external device 150, the controller 113 will activate the bus protection circuit 440. As a result, in this abnormal mode, no current will flow through the resistor 422. The PMOS transistor 424 will be turned off and the voltage at node 421 will be set to low. The NMOS transistors 117 and 444 are turned off. Since the discharging control signal provided by the controller 113 is also set to low, the NMOS transistors 115 and 442 are both turned off simultaneously. In the abnormal condition, the intrinsic diodes associated with the NMOS transistors 115 and 117 are connected back-to-back. Similarly, the intrinsic diodes associated with the NMOS transistors 442 and 444 are also connected back-to-back. Since the NMOS transistors 115 and 117 are turned off, the ground of the external device 150 is not connected to the ground of the battery 111. Consequently, the buses 401 and 403 are non-common ground buses and they are isolated from each other. Hence, the bus protection can be achieved in the abnormal condition.

Figure 5C:
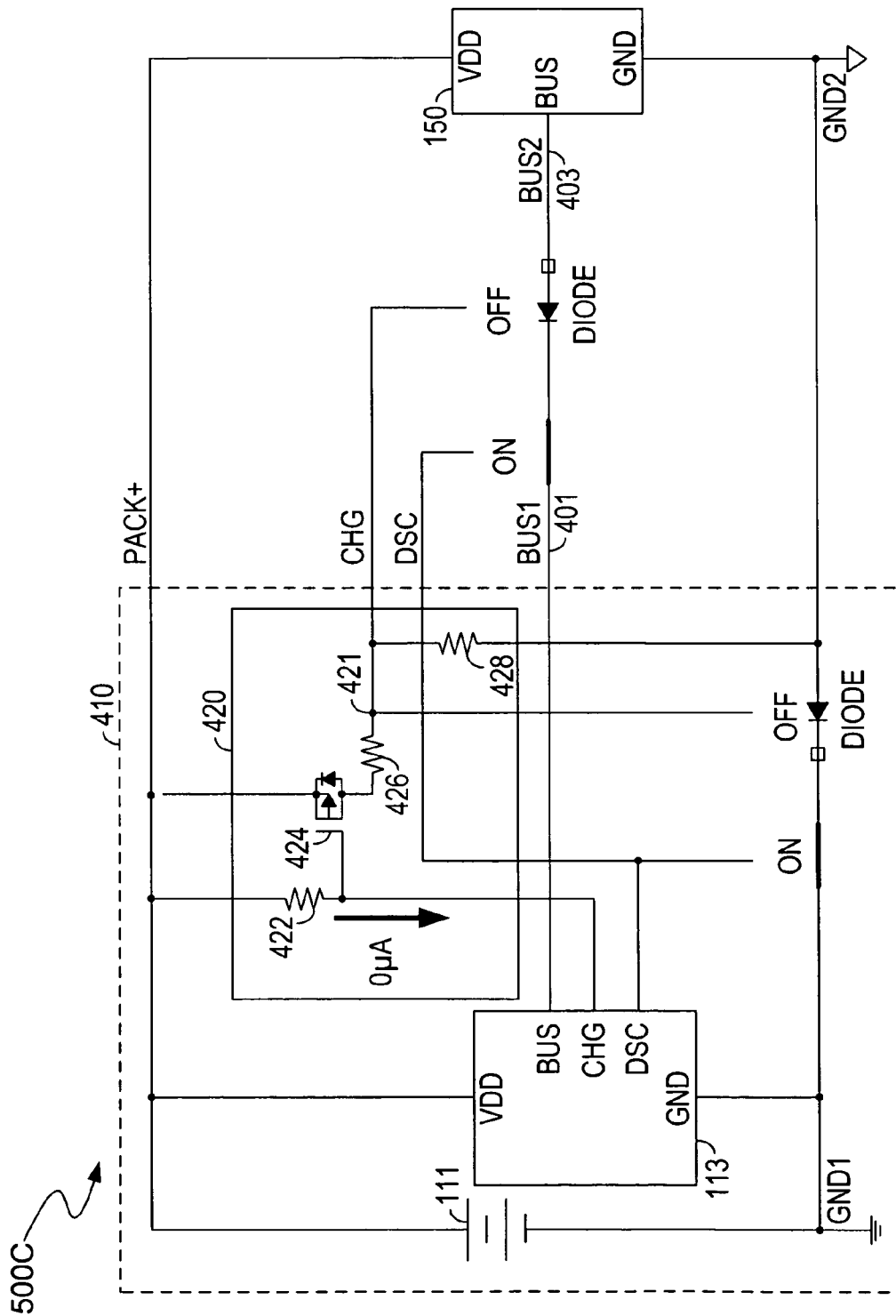

FIG. 5C illustrates a charging mode in which the battery pack application 400 operates when the external device 150 is a charger. In the charging mode, the charging voltage provided by the charger 150 may be too high and over-voltage may occur. The controller 113 can sense this situation. The charging control signal provided by the controller 113 is set to high and no current flows though the resistor 422. Hence, the voltage at node 421 is set to low and the NMOS transistors 117 and 444 are turned off. As a result, the ground of the charger 150 is not common to the ground of the battery 111 and the buses 401 and 403 are isolated from each other to avoid being destroyed due to the over-voltage.

Figure 5D:
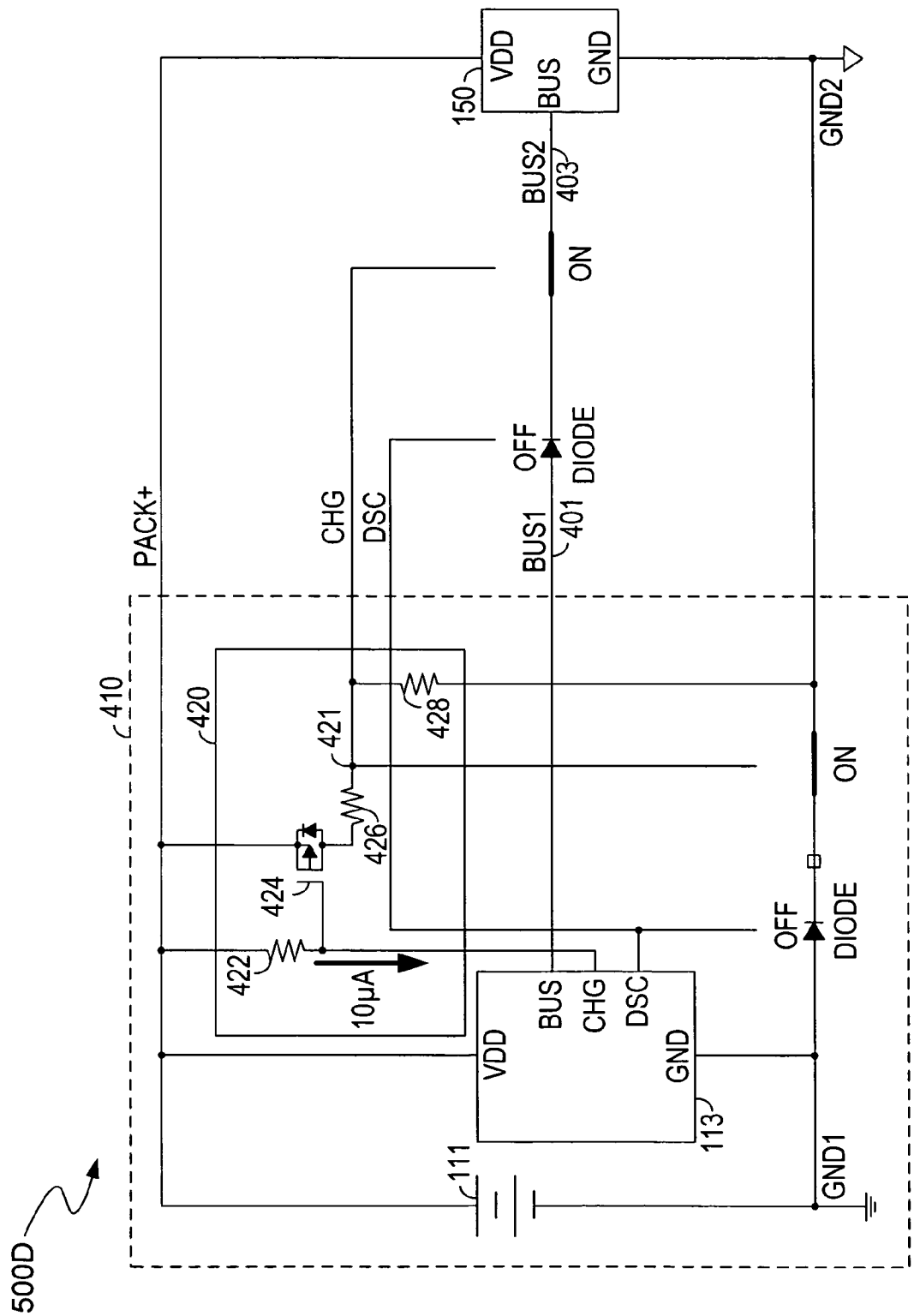

FIG. 5D illustrates a discharging mode in which the battery pack application 400 operates when the external device 150 is a load. In the discharging mode, the load 150 may be short-circuited or the battery cannot provide sufficient voltage to the load 150. The aforementioned situations can be sensed in real time by the controller 113. In these situations, the discharging control signal will be set to low, and the NMOS transistors 115 and 442 will be turned off simultaneously. Hence, the ground of the load 150 is not common to the ground of the battery 111 and the buses 401 and 403 are non-common ground buses. Since the NMOS transistor 442 is turned off, the buses 401 and 403 are isolated from each other and the communication between the battery 111 and the load 150 is blocked. Therefore, the bus protection is achieved in the discharging mode.

Figure 6:
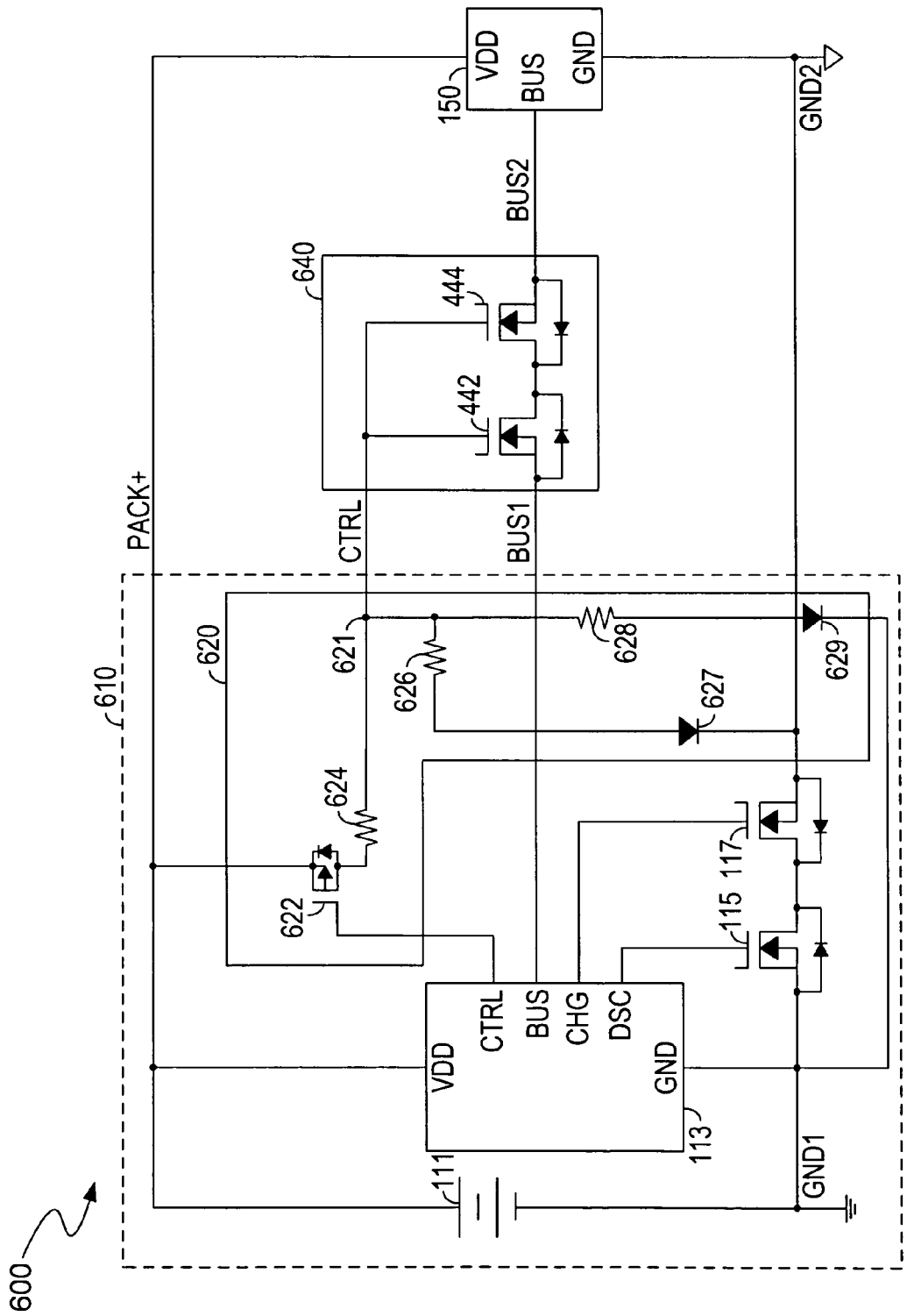
FIG. 6 is a simplified schematic diagram of a battery pack application with analog switches controlled by one control port according to the invention.

FIG. 6 is a simplified schematic diagram of a battery pack application 600 with analog switches controlled by one control port. The symbols in FIG. 6 are similar to those in FIG. 4, and the similar functions of the same external devices will be omitted herein for clarity. Only the difference and improvement will be further described in details as following.

In FIG. 6, the battery pack application 600 includes a battery pack 610, a bus protection circuit 640, and the external device 150. The battery pack 610 includes a level shift circuit 620. The level shift circuit 620 is composed of a PMOS transistor 622, a resistor 624, a resistor 626 coupled in serial with a diode 627, and a resistor 628 coupled in serial with a diode 629. The cathode of the diode 629 is connected to the ground of the battery 111 to prevent a leakage current. The cathode of the diode 627 is connected to the ground of the external device 150 to prevent another leakage current. The level shift circuit 620 can control the bus protection circuit 640 formed by the NMOS transistors 442 and 444. The NMOS transistors 442 and 444 are analog switches controlled by one control port shown as node 621.

When the battery pack 610 operates, the controller 113 can sense the status of the battery 111 and the external device 150. The controller 113 can generate a control signal to control the PMOS transistor 622, a charging control signal to control the NMOS transistor 117, and a discharging control signal to control the NMOS transistor 115. When an abnormal condition occurs, the control signal generated by the controller 113 is set to high, and then the PMOS transistor 622 is turned off. Hence, a current will not flow through the resistor 624. The voltage at node 621 will be set to low. The NMOS transistors 442 and 444 are turned off simultaneously. If the battery pack application 600 is in the charging process, the charging control signal will be set to low when the abnormal situation occurs. The NMOS transistor 117 will be turned off and so the ground of external device 150 is not common to the ground of the battery 111. Likely, the NMOS transistor 114 will be turned off during the discharging process when the abnormal condition occurs and so the ground of the external device 150 is not common to the ground of the battery 111. Consequently, whether during the charging or discharging process, the buses 401 and 403 are non-common ground buses. The isolation between these buses can prevent communication between the battery 111 and the external device 150. Accordingly, the bus protection can be achieved by using the above isolation technology.

When the external device 150 is a charger, it can charge the battery 111 and hence a current will flow through the battery 111 to the ground of the battery 111. The diode 629 can prevent the current to further flow through the resistor 628 and back to the node 621. Conversely, when the external device 150 is a load, it may receive power from the battery 111 and hence a current will flow through the load 150 to the ground of the load 150. The diode 627 can prevent the current to further flow through the resistor 626 and back to the node 621.

Similar to the battery pack application 400 in FIG. 4, the battery pack application 600 can include any number (larger than two) of the NMOS transistors to control the charging and/or discharging process and also can have any number (larger than two) of the NMOS transistors for the configuration of the bus protection circuit 640. In addition, the controller 113 in FIGS. 4 and 6 can be formed by any analog circuit, digital circuit, integrated circuit or the combination thereof that can implement the aforementioned functions.

Figure 7:
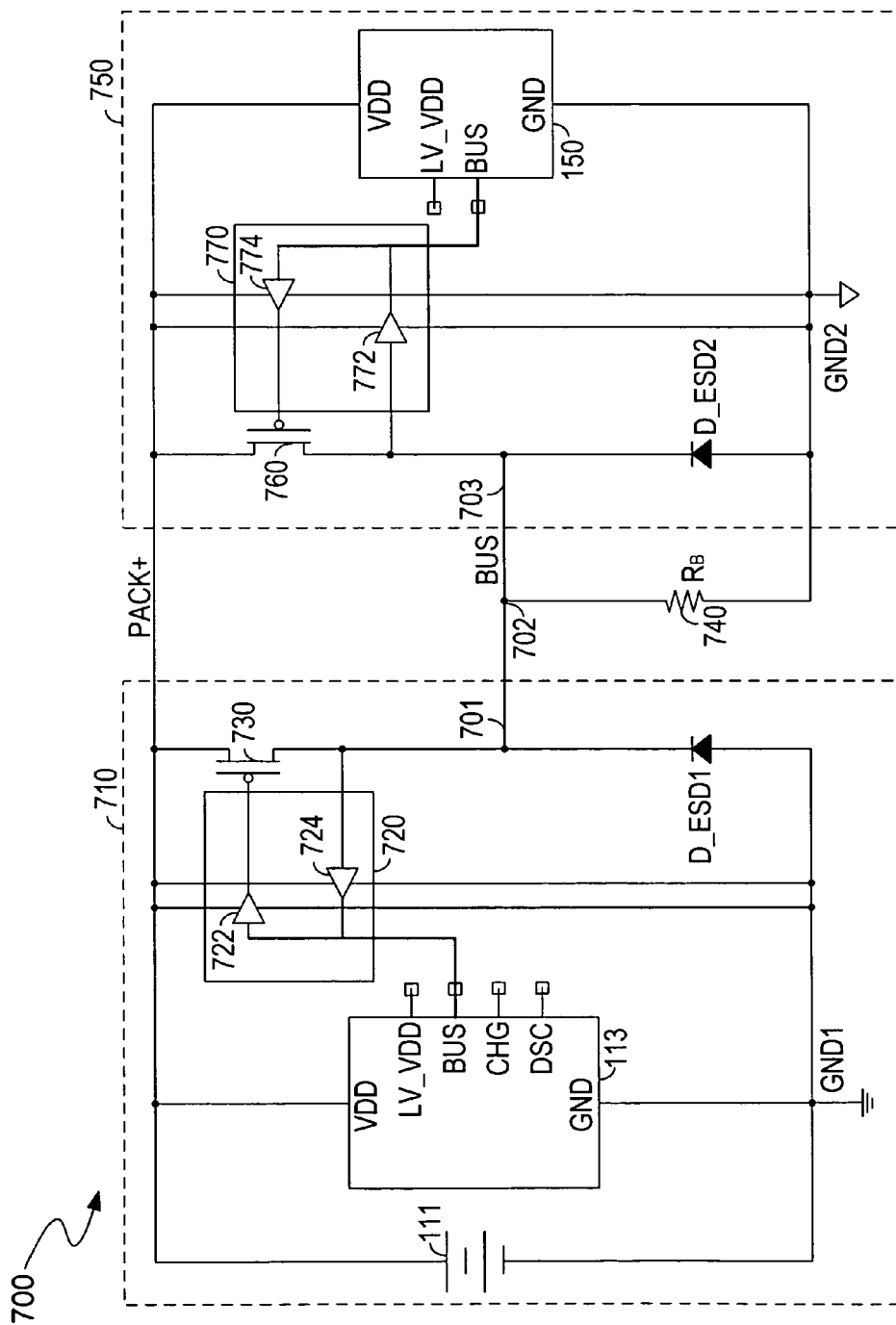
FIG. 7 is a simplified block diagram of an intelligent battery pack application using common $V_{PACK+}$ buses according to the invention.

FIG. 7 is a simplified block diagram of a battery pack application 700 using a common $V_{PACK}+$ bus. The battery pack application 700 mainly consists of a battery pack 710, a resistor 740, and an element part 750. Buses 701 and 703 are used for communication between the battery pack 710 and the element part 750. The battery pack 710 includes the battery 111, the controller 113, a level shifter 720, and a PMOS transistor 730. The level shifter 720 includes buffers 722 and 724. The controller 113 exchanges information with the level shifter 720 via a bus. The element part 750 includes the external device 150, a PMOS transistor 760, and a level shifter 770. The level shifter 770 includes buffers 772 and 774. The external device 150 exchanges information with the level shifter 770 via a bus.

When the external device 150 is a charger, the controller 113 can sense how much charge the battery 111 has. In the charging process, the controller 113 can send information reflecting the status of the battery 111 to the level shifter 720 via a bus. The buffer 722 receives the information and generates a voltage that is logic 0. The PMOS transistor 730 then is turned on and a current will flow through the resistor 740 to the ground of the charger 150. As a result, a voltage will be generated at node 702 that can drive the buffer 772. The buffer 772 can also deliver the information covered by the voltage described above to the charger 150.

Conversely, the information reflecting the status of the charger 150 can be sent to the buffer 774, and the buffer 774 can generate a voltage, logic 0 to drive the PMOS transistor 760. A current will flow through the resistor 740 and so a voltage will be generated at node 702. The buffer 724 can send the information covered by the voltage back to the controller 113. Consequently, the battery 111 can communicate with the charger 150 via the buses 701 and 703.

When the external device 150 is a load, the controller 113 can sense the status of the load 150, for example, whether it is short-circuited or not. The description of the communication during the discharging process is omitted herein for clarity because the communication in the discharging process is similar to that in the charging process.

As shown in FIG. 7, the buses 701 and 703 are non-common ground buses and also common $V_{PACK}+$ buses. Since the voltage difference between the buses 701 and 703 and the terminal PACK+ is not large, the low-power buses 701 and 703 can be protected and cannot be destroyed even if the battery pack application 700 is supplied with high power.

Figure 8:
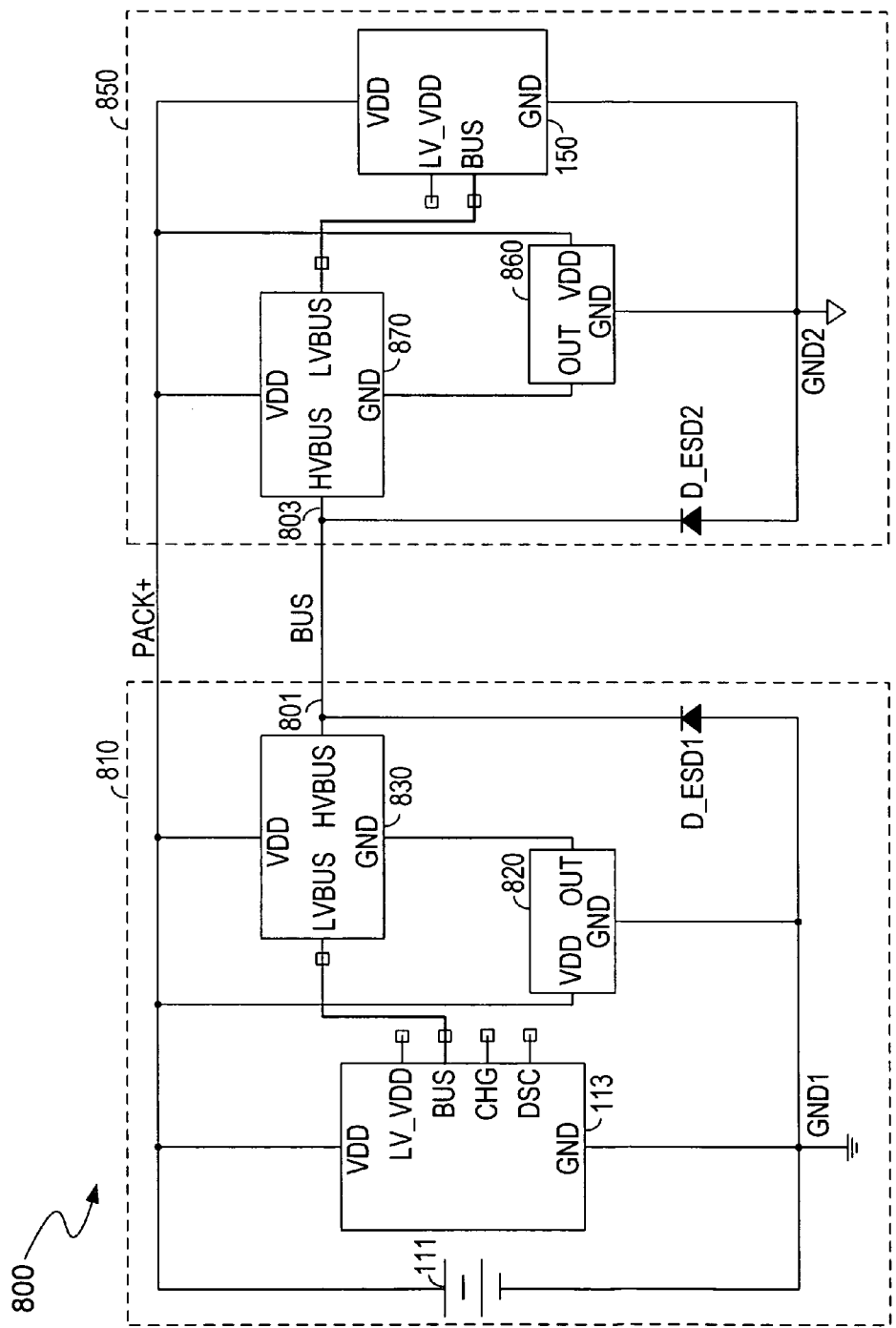
FIG. 8 is a simplified block diagram of an intelligent battery pack application using common $V_{PACK+}$ buses according to the invention.

FIG. 8 is a simplified block diagram of an intelligent battery pack application 800 using a common $V_{PACK}+$ bus. The battery pack application 800 is mainly composed of a battery pack 810 and an element part 850. Buses 801 and 803 are used for communication between the battery pack 810 and the element part 850. The battery pack 810 includes a battery 111, a controller 113, a low drop-out (LDO) circuit 820 and a level shifter 830. The element part 850 includes the external device 150, a LDO circuit 860, and a level shifter 870. The controller 113 can sense the status of the battery 111, and send the information reflecting the above status to the level shifter 830 via a bus. The LDO circuit 820 is powered by the voltage at terminal PACK+ referenced to the real ground and generates a constant voltage to the level shifter 830. So the difference between the voltage at terminal PACK+ and the output voltage of the LDO circuit 820 will a relatively fixed value. The level shifter 830 can convert the information to a voltage and this voltage signal is sent to the level shifter 870 via the buses 801 and 803. Powered by the voltage at terminal PACK+, the level shifter 870 can send the voltage to the external device 150 via a bus. In a reverse direction, the information reflecting the status of the external device 150 can be sent back to the battery 111. Hence, the communication between the battery 111 and the external device 150 can be achieved.

In FIG. 8, the buses 801 and 803 are not common ground buses, but common $V_{PACK}+$ buses. Since the voltage difference differential between the voltage $V_{PACK}+$ and the voltage on buses 801 and 803 is not large, the low-power buses 801 and 803 can be protected and will not be destroyed even if the battery pack application 800 is supplied with high power, for example, when the voltage of the charger 150 is 50 volts.

The embodiments 700 and 800 are only used for illustrative purposes, any alternation or changes can be made without departing from the spirit of the invention. In addition, some peripheral elements are not shown in FIGS. 7 and 8 for more clarity. Those skilled in the art will appreciate that the insertion of these peripheral elements does not depart from the scope of the invention.

The above-mentioned protection technology can be used in high-power electrical systems. The high-power electrical systems can include, by way of example, electrical bicycles, electrical motorcycles, and other electrical vehicles. An electrical vehicle usually includes a body with a moving mechanism, an electric motor and a battery device. The electric motor can drive the body. The battery device is capable of supplying power to the electric motor and can employ any of the aforementioned configurations and technologies to protect the buses included in the batter device. The description of the operation of the electrical vehicle will be omitted herein for more clarity.

Figure 9:
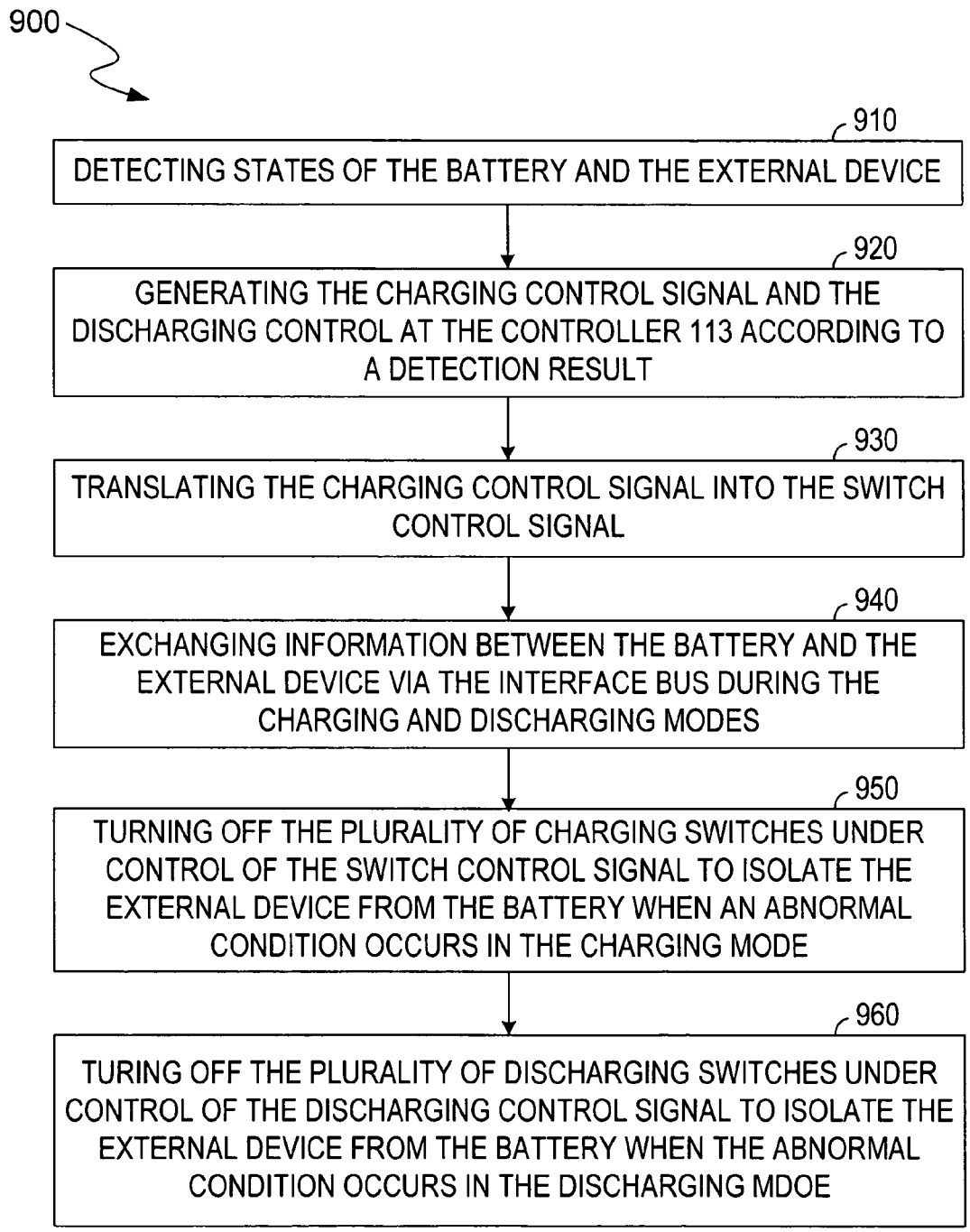
FIG. 9 illustrates a flow chart of operation of the battery pack application in FIG. 4.

FIG. 9 illustrates a flow chart of operation of the battery pack application 400. In step 910, the controller 113 can detect states the battery 111 and the external device 150. In step 920, the controller 113 generates the charging control signal and the discharging control signal according to the detection result. In step 930, the level shifter 420 translates the charging control signal into a switch control signal. In step 940, information can be exchanged between the battery and the external device via the interface buses 401 and 403 during the charging and discharging modes. In step 950, the plurality of charging switches 117 and 444 are turned off under control of the switch control signal to isolate the external device 150 from the battery 111 when an abnormal condition occurs in the charging mode. In step 960, the plurality of discharging switches 115 and 442 are turned off under control of the discharging control signal to isolate the external device 150 from the battery 111 when the abnormal condition occurs in the discharging mode In operation, the battery 111 can communicate with a load, or a charger, 150 in a normal mode. In this mode, the controller 113 can set the discharging control signal to high and the charging control signal to low. When the PMOS transistor 424 is turned on, the level shift circuit 420 can output logic 1 at node 421. All of the NMOS transistors will be turned on. In this mode, the buses 401 and 403 are common ground buses because the turnoff of the NMOS transistors in the protection circuit 440 and the battery pack 410 can communicate with the load or charger 150 via the buses 401 and 403.

If anything abnormal occurs at the battery 111 and/or the load 150, the level shifter 420 can activate the protection circuit 440 to protect the buses 401 and 403. In the abnormal mode, the controller 113 can set the charging control signal and the discharging control signal to respectively high and low. Hence, the charging control signal (high) and the discharging control signal (low) can cause all of the NMOS transistors to be turned off. In the abnormal mode, the ground of the load 150 is not common to the ground of the battery 111 and the buses 401 and 403 are non-common ground buses. In the abnormal mode, the NMOS transistor in the protection circuit 440 will be turned off and as such the buses 401 and 403 are isolated. Hence, the buses 401 and 403 are protected in the abnormal mode.

If the external device 150 is a charger, the battery 111 will operate in a charging mode. When an abnormality occurs in the charging mode, the controller 113 will stop the charging process by turning off the associated NMOS transistor. The NMOS transistors 117 and 444 are turned off in the charging mode. Then the buses 401 and 403 are non-common ground buses and they can be protected because of the isolation between the controller 113 and the charger 150.

If the external device 150 is a load, the battery 111 will operate in a discharging mode. If an abnormality occurs in the discharging mode, the controller 113 will stop the discharging process because the associated NMOS transistors are turned off. The NMOS transistors 115 and 442 will be turned off in the discharging mode. Consequently, the buses 401 and 403 are non-common ground buses and they can be protected due to the isolation between the controller 113 and the load 150.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. A protection device for non-common ground buses, the non-common ground buses including a first bus and a second bus, the protection device comprising:
    a controller coupled in parallel to a battery, the controller generating a first control signal and a second control signal;
    a level shifter coupled to the battery and the controller, the level shifter receiving the first control signal and generating a third control signal;
    a first group of switches coupled to the controller via the first bus and to an external element via the second bus, the first group of switches being controlled by the second control signal from the controller and the third control signal from the level shifter; and
    a second group of switches coupled between a ground terminal of the battery and a ground terminal of the external element, the second group of switches being controlled by the second control signal from the controller and the third control signal from the level shifter,
    wherein at least part of the first group of switches are turned off to isolate the first bus from the second bus when an abnormal situation occurs.

2. The protection device of claim 1, wherein the level shifter further comprising:
    a transistor having a gate terminal, a source terminal, and a drain terminal and the source terminal being coupled to an anode of the battery;
    a resistor coupled between the gate terminal and the source terminal of the transistor; and
    a voltage divider coupled between the drain terminal of the transistor and the ground of the external element, the voltage divider having a node and generating the control signal at the node.

3. A protection device for non-common ground buses, the non-common ground buses including a first bus and a second bus, the protection device comprising:
    a controller coupled in parallel to a battery, the controller generating a charging signal, a discharging signal, and a first control signal;
    a level shifter coupled to the battery and the controller, the level shifter receiving the first control signal and generating a second control signal;
    a first group of switches coupled to the controller via the first bus and to an external element via the second bus, the first group of switches being controlled by the second control signal from the level shifter; and
    a second group of switches coupled between the ground of the battery and the ground of the external element, the second group of switches being controlled by the charging signal and the discharging signal from the controller,
    wherein at least part of the first group of switches are turned off to isolate the first bus from the second bus when abnormal situation occurs.

4. The protection device of claim 3, wherein the level shifter comprising:
    a first diode having an anode and a cathode, the cathode of the first diode being coupled to the ground of the external element;

a first resistor, the first resistor being coupled between the anode of the first diode and the node;

a second diode having an anode and a cathode, the cathode of the second diode being coupled to the ground of the battery;

a second resistor, the second resistor being coupled between the anode of the second diode and the node;

a third resistor coupled the node; and a transistor, the transistor having a gate terminal receiving the first control signal from the controller, a source terminal coupled to an anode of the battery, and a drain terminal coupled to the third resistor.

5. An apparatus for protecting non-common ground buses, the non-common ground buses including a first bus and a second bus, the apparatus comprising:

a controller coupled in parallel to a battery;

a first level shifter coupled in parallel to the battery, the first level shifter exchanging information with the controller;

a first switch coupled to an anode of the battery and being controlled by the first level shifter;

a second level shifter coupled in parallel to an external element; and a second switch coupled to the anode of the battery and being controlled by the second level shifter.

6. The apparatus of claim 5, wherein each of the first and second level shifters includes a plurality of buffers.

7. The apparatus of claim 5, wherein the first level shifter communicates with the second level shifter via the first and second buses when one of the first and second switches is turned on.

8. An apparatus for protecting non-common ground buses, the non-common ground buses including a first bus and a second bus, the apparatus comprising:

a controller coupled in parallel to a battery a first level shifter coupled to the battery and the controller;

a first low drop-out (LDO) circuit coupled in parallel to the battery, the first LDO circuit generating a first output voltage to supply the first level shifter;

a second level shifter coupled in parallel to an external element, the second level shifter communicating with the first level shifter via the first and second buses; and a second LDO circuit coupled in parallel to the external element, the second LDO circuit generating a second output voltage to supply the second level shifter.

9. The apparatus of claim 8, wherein the first and second level shifters includes a plurality of buffers respectively.

10. An electrical vehicle, comprising:

a body;

an electric motor for driving the body; and a battery device for supplying power to the electric motor, the battery device being capable of protecting non-common ground buses in abnormal situations, the non-common ground buses including a first bus and a second bus, the battery device including:

a battery;

a controller coupled in parallel to a battery, the controller generating a first control signal and a second control signal;

a level shifter coupled to the battery and the controller, the level shifter receiving the first control signal and generating a third control signal;

a first group of switches coupled to the controller via the first bus and to the electric motor via the second bus, the first group of switches being controlled by the second control signal from the controller and the third control signal from the level shifter; and a second group of switches coupled between the ground of the battery and the ground of the electric motor, the second group of switches being controlled by the second control signal from the controller and the third control signal from the level shifter, wherein at least part of the first group of switches are turned off to isolate the first bus from the second bus when an abnormal situation occurs.

11. The electrical vehicle of claim 10, wherein the level shifter comprising:

a transistor, the transistor having a gate terminal, a source terminal, and a drain terminal and the source terminal being coupled to an anode of the battery;

a resistor, the resistor being coupled between the gate terminal and the source terminal of the transistor; and a voltage divider coupled between the drain terminal of the transistor and the ground of the electric motor, the voltage divider having a node and generating the control signal at the node.

12. A method for protecting an interface bus in a battery application system, the method comprising the steps of:

detecting states of a battery and an external device;

generating a charging control signal and a discharging control signal at a controller according to a detection result;

translating the charging control signal into a switch control signal;

exchanging information between the battery and the external device via the interface bus during a charging and discharging mode;

turning off a plurality of charging switches under control of the switch control signal to isolate the external device from the battery when an abnormal condition occurs in the charging mode; and turning off a plurality of discharging switches under control of the discharging control signal to isolate the external device bus from the battery when the abnormal condition occurs in the discharging mode.

* * * * *